(12) United States Patent
Takahashi et al.

(10) Patent No.: US 8,597,815 B2
(45) Date of Patent: Dec. 3, 2013

(54) NONAQUEOUS ELECTROLYTE RECHARGEABLE BATTERY

(75) Inventors: Keiichi Takahashi, Hyogo (JP); Shinji Mino, Osaka (JP); Tsunenori Yoshida, Kyoto (JP)

(73) Assignee: Panasonic Corporation, Osaka (JP)

( * ) Notice: Subject to any disclaimer, the term of this patent is extended or adjusted under 35 U.S.C. 154(b) by 32 days.

(21) Appl. No.: 12/823,869

(22) Filed: Jun. 25, 2010

(65) Prior Publication Data

US 2010/0330410 A1    Dec. 30, 2010

Related U.S. Application Data

(63) Continuation of application No. PCT/JP2008/004012, filed on Dec. 26, 2008.

(30) Foreign Application Priority Data

Dec. 26, 2007  (JP) .................. 2007-334878
Mar. 7, 2008   (JP) .................. 2008-057829

(51) Int. Cl.
  *H01M 10/52*  (2006.01)
  *H01M 2/16*   (2006.01)
  *H01M 4/26*   (2006.01)

(52) U.S. Cl.
  USPC .................... 429/129; 429/246; 29/623.5

(58) Field of Classification Search
  None
  See application file for complete search history.

(56) References Cited

U.S. PATENT DOCUMENTS

2007/0072083 A1* 3/2007 Ikuta et al. ............. 429/246
2007/0218362 A1  9/2007 Nagasaki et al.
2008/0036824 A1* 2/2008 Ishikawa ................ 347/71
2011/0045168 A1* 2/2011 Seo et al. ................ 427/58

FOREIGN PATENT DOCUMENTS

| JP | 06-036800 | 2/1994 | |
| JP | 07-220759 | 8/1995 | |
| JP | 10-241656 | 9/1998 | |
| JP | 3371301 | 1/2003 | |
| JP | 2005-078985 | * 3/2005 | ........... H01M 4/02 |
| JP | 2005-183179 | * 7/2005 | ........... H01M 4/02 |
| JP | 2005-294139 | 10/2005 | |
| JP | 2005-310622 | 11/2005 | |
| JP | 2007-311084 | * 11/2007 | ........... H01M 10/36 |

OTHER PUBLICATIONS

Japanese Notice of Reasons for Rejection, with English Translation, issued in Japanese Patent Application No. 2009-546960, mailed Feb. 2, 2010.

* cited by examiner

*Primary Examiner* — Barbara Gilliam
*Assistant Examiner* — Angela Martin
(74) *Attorney, Agent, or Firm* — McDermott Will & Emery LLP

(57) ABSTRACT

A nonaqueous electrolyte secondary battery according to the present invention includes: a negative-electrode current collector 16; a negative-electrode active material layer 15 provided on the negative-electrode current collector 16; a positive-electrode current collector 11; a positive-electrode active material layer 12 provided on a face of the positive-electrode current collector 11 opposing the negative-electrode active material layer 15; and at least one inorganic insulating layer 13 provided between the positive-electrode active material layer 12 and the negative-electrode active material layer 15, the at least one inorganic insulating layer 13 being composed of inorganic particles. The inorganic insulating layer 13 contains no binder.

5 Claims, 6 Drawing Sheets

NONAQUEOUS ELECTROLYTE RECHARGEABLE BATTERY

This is a continuation of International Application No. PCT/JP2008/004012, with an international filing date of Dec. 26, 2008, which claims priority of Japanese Patent Application No. 2007-334878, filed on Dec. 26, 2007 and Japanese Patent Application No. 2008-057829, filed on Mar. 7, 2008, the contents of which are hereby incorporated by reference.

BACKGROUND OF THE INVENTION

1. Field of the Invention

The present invention relates to an electrode for a nonaqueous electrolyte secondary battery, and a nonaqueous electrolyte secondary battery in which the same is used.

2. Description of the Related Art

A lithium-ion secondary battery includes, between a positive electrode and a negative electrode, a separator which electrically insulates the respective electrode plates and further serves to retain an electrolyte solution. Currently, organic polymer-type microporous films composed of polyethylene, polypropylene, or the like are mainly used as separators.

A microporous film composed of the above resins has a property such that it shrinks at a temperature of about 100° C. Therefore, when a metallic element such as lithium has deposited due to peeling of a portion of an active material layer or the like, or when a protrusion having a sharp shape such as a nail has penetrated the battery from the outside, a short-circuit current flows, and the heat of reaction which instantaneously occurs due to the flowing current causes the separator to shrink. When the separator shrinks, the short-circuiting area between the positive electrode and the negative electrode is further expanded.

As a measure of preventing short-circuiting, Japanese Laid-Open Patent Publication No. 7-220759 discloses a method of forming a porous protection film on the surface of a negative-electrode active material layer or a positive-electrode active material layer. This porous protection film is formed by mixing a powder of inorganic substance such as alumina with a binder agent of resin, and applying the mixture onto the surface of the negative-electrode active material layer or the positive-electrode active material layer.

Japanese Patent No. 3371301 discloses a technique of forming a porous coating film through application on the surface of an active material layer, the porous coating film containing solid microparticles.

Japanese Laid-Open Patent Publication No. 6-36800 discloses a technique of forming a porous insulating film on the surface of a negative electrode by sputtering. Japanese Laid-Open Patent Publication No. 6-36800 describes that, when forming a porous insulating film by a sputtering technique, the thickness is desirably 5 nm to 100 nm.

When a porous protection film is formed by coating technique as is disclosed in Japanese Laid-Open Patent Publication No. 7-220759 and Japanese Patent No. 3371301, there is a problem in that the porous protection film has poor adherence.

Moreover, an active material layer is formed by applying a mixture of an active material and an organic solvent containing a binder (binder agent) onto a current collector. Therefore, if a porous protection film in which an organic solvent containing a binder is mixed is applied further thereon, one layer may dissolve into the organic solvent of the other layer such that the active material layer and the porous protection film become mixed together. In order to prevent this, as a solvent to be used for the paint to be applied as the overlayer, it has been necessary to employ a separate organic solvent to which the underlying binder is unlikely to dissolve. Even if such an organic solvent is used, the electrode plates may be warped due to a difference in their shrinkage ratios when being dry.

On the other hand, a porous insulating film which is formed by the sputtering technique of Japanese Laid-Open Patent Publication No. 6-36800 has a strong internal stress. Therefore, with the method of Japanese Laid-Open Patent Publication No. 6-36800, it is difficult to form a film so thick as to provide sufficient insulation between the positive electrode and the negative electrode. There is also a problem in that, since a film having a high density is formed by sputtering technique, the ion conductivity between the positive electrode and the negative electrode is lowered.

The present invention has been made in order to solve the above problems, and an objective thereof is to provide a nonaqueous electrolyte secondary battery which is excellent in safety because short-circuiting is unlikely to progress, this being achieved by enhancing the adherence between an active material layer and an inorganic insulating layer while ensuring electrical insulation and ion conductivity between electrodes, and provide an electrode for a nonaqueous electrolyte secondary battery.

SUMMARY OF THE INVENTION

A first nonaqueous electrolyte secondary battery according to the present invention comprises: a negative-electrode current collector; a negative-electrode active material layer provided on the negative-electrode current collector; a positive-electrode current collector; a positive-electrode active material layer provided on a face of the positive-electrode current collector opposing the negative-electrode active material layer; and at least one porous inorganic insulating layer provided between the positive-electrode active material layer and the negative-electrode active material layer, the porous inorganic insulating layer being composed of inorganic particles, wherein the porous inorganic insulating layer contains no binder.

In one embodiment, the porous inorganic insulating layer is a layer formed by jetting the inorganic particles together with a carrier gas.

In one embodiment, the porous inorganic insulating layer is a layer in which the inorganic particles are directly bonded, with no binder present therebetween.

One embodiment further comprises a separator provided between the positive-electrode active material layer and the negative-electrode active material layer, wherein the porous inorganic insulating layer is provided in at least one of: between the separator and the negative-electrode active material layer; and between the separator and the positive-electrode active material layer.

One embodiment comprises two said porous inorganic insulating layers, wherein the two porous inorganic insulating layers are respectively provided between the separator and the negative-electrode active material layer and between the separator and the positive-electrode active material layer.

In one embodiment, the porous inorganic insulating layer is a layer formed by forming an aerosol containing the inorganic particles, and allowing the aerosol to collide with at least one of the positive-electrode active material layer, the negative-electrode active material layer, and the separator.

In one embodiment, the inorganic particles are inorganic oxide particles, inorganic nitride particles, inorganic fluoride particles, or lithium-ion conductive inorganic solid electrolytes, or a mixture or compound thereof.

In one embodiment, an average particle size of the inorganic particles is no less than 0.05 μm and no more than 10 μm.

In one embodiment, the inorganic particles is alumina.

In one embodiment, the porous inorganic insulating layer is provided on a surface of the positive-electrode active material layer.

An electrode for a nonaqueous electrolyte secondary battery according to the present invention comprises: a current collector; an active material layer provided on the current collector; and a porous inorganic insulating layer provided on a surface of the active material layer, the porous inorganic insulating layer being composed of inorganic particles, wherein the porous inorganic insulating layer contains no binder.

In one embodiment, the porous inorganic insulating layer has a packing fraction of no less than 40% and no more than 95% and a thickness of no less than 0.3 μm and no more than 20 μm.

In one embodiment, the porous inorganic insulating layer includes flat particles having a particle diameter of no less than 0.05 μm and no more than 5 μm.

In one embodiment, the porous inorganic insulating layer is a layer formed by jetting inorganic particles together with a carrier gas.

In one embodiment, the porous inorganic insulating layer contains a substance selected from the group consisting of alumina, mullite, silica, titania, and magnesia.

A second nonaqueous electrolyte secondary battery according to the present invention comprises: the electrode of claim 11 as a positive electrode; a negative electrode; and an electrolyte solution containing a nonaqueous solvent.

In one embodiment, the active material layer contains lithium complex oxide.

A second nonaqueous electrolyte secondary battery according to the present invention comprises: the electrode of claim 11 as a negative electrode; a positive electrode; and an electrolyte solution containing a nonaqueous solvent.

One embodiment does not comprise any organic polymer-type separator.

A separator according to the present invention is a separator to be used for a nonaqueous electrolyte secondary battery, the separator comprising a porous inorganic insulating layer provided in at least a portion of a surface of the separator, the porous inorganic insulating layer being composed of inorganic particles, wherein the porous inorganic insulating layer contains no binder.

A first production method for a nonaqueous electrolyte secondary battery according to the present invention is a production method for a nonaqueous electrolyte secondary battery, the nonaqueous electrolyte secondary battery including a positive electrode having a positive-electrode active material layer, a negative electrode having a negative-electrode active material layer, and a separator, comprising: step (a) of jetting inorganic particles onto a surface of the positive-electrode active material layer, the negative-electrode active material layer, or the separator together with a carrier gas, thereby forming a porous inorganic insulating layer composed of the inorganic particles; and step (b) of forming an electrode group by allowing the separator to be sandwiched by the positive electrode and the negative electrode, accommodating the electrode group in a case, and thereafter filling the case with a nonaqueous electrolyte.

In one embodiment, step (a) forms an aerosol containing the inorganic particles, and allows the aerosol to collide with a surface of the positive-electrode active material layer, the negative-electrode active material layer, or the separator.

A second production method for a nonaqueous electrolyte secondary battery according to the present invention is a production method for a nonaqueous electrolyte secondary battery, the nonaqueous electrolyte secondary battery including a positive electrode having a positive-electrode active material layer and a negative electrode having a negative-electrode active material layer, comprising the steps of: (a) jetting an aerosol onto a surface of the positive-electrode active material layer or the negative-electrode active material layer, thereby forming a porous inorganic insulating layer composed of inorganic particles; and (b) forming an electrode group by allowing the porous inorganic insulating layer to be sandwiched by the positive electrode and the negative electrode, accommodating the electrode group in a case, and thereafter filling the case with a nonaqueous electrolyte.

A third nonaqueous electrolyte secondary battery according to the present invention comprising: a negative-electrode current collector; a negative-electrode active material layer provided on the negative-electrode current collector; a positive-electrode current collector; a positive-electrode active material layer provided on a face of the positive-electrode current collector opposing the negative-electrode active material layer; a separator provided between the positive-electrode active material layer and the negative-electrode active material layer; and at least one porous inorganic insulating layer provided in at least one of: between the separator and the negative-electrode active material layer; and between the separator and the positive-electrode active material layer, the porous inorganic insulating layer being composed of inorganic particles, wherein the porous inorganic insulating layer is a layer formed by jetting an aerosol onto a surface of the separator, and contains no binder.

One embodiment comprises two said porous inorganic insulating layers, wherein the two porous inorganic insulating layers are respectively provided between the separator and the negative-electrode active material layer and between the separator and the positive-electrode active material layer.

In a nonaqueous electrolyte secondary battery according to the present invention, a porous inorganic insulating layer contains no binder, and inorganic particles contained in the porous inorganic insulating layer directly bond to other inorganic particles or to the surface of another member. Therefore, as compared to the case of using a binder for adhesion, the porous inorganic insulating layer has an increased adherence. This makes it possible to avoid a problem of losing a portion of the inorganic insulating layer in the step of processing the positive electrode, the negative electrode, and the separator, which would cause short-circuiting between the electrodes.

Other features, elements, processes, steps, characteristics and advantages of the present invention will become more apparent from the following detailed description of preferred embodiments of the present invention with reference to the attached drawings.

BRIEF DESCRIPTION OF THE DRAWINGS

FIG. 4(a) is a cross-sectional view showing a positive electrode of a lithium-ion secondary battery of the present embodiment, whereas FIG. 4(b) is a diagram representing an image of a state where an inorganic insulating layer 13 is formed on the surface of a positive electrode of a lithium-ion secondary battery.

DETAILED DESCRIPTION OF PREFERRED EMBODIMENTS

First Embodiment

Figure 1:
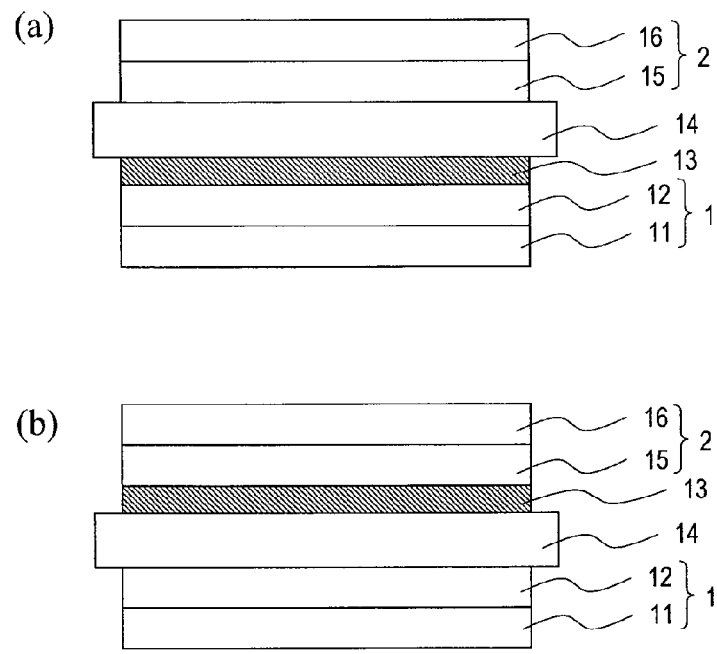
FIGS. 1(a) and 1(b) are cross-sectional views showing a first embodiment of a lithium-ion secondary battery according to the present invention.

FIGS. 1(a) and (b) are cross-sectional views showing a first embodiment of a lithium-ion secondary battery according to the present invention. Although FIGS. 1(a) and (b) show a main portion of the lithium-ion secondary battery, the lithium-ion secondary battery of the present embodiment may be a wound-type battery such as a prismatic-type battery or a cylindrical-type battery, or may be a stacked-type battery. The lithium-ion secondary battery shown in FIG. 1(a) includes: a positive electrode 1 having a positive-electrode current collector 11 and a positive-electrode active material layer 12; a negative electrode 2 having a negative-electrode current collector 16 and a negative-electrode active material layer 15; and a separator 14 sandwiched by the positive electrode 1 and the negative electrode 2. Between the separator 14 and the positive-electrode active material layer 12 is provided a porous inorganic insulating layer 13, which is composed of a plurality of inorganic particles and does not contain any binder.

The inorganic insulating layer 13 is formed by jetting a plurality of inorganic particles together with a carrier gas. Specifically, the positive electrode 1 and the separator 14 are prepared, and an aerosol containing inorganic particles is jetted onto the surface of the positive-electrode active material layer 12 or the separator 14, thus forming the inorganic insulating layer 13 (AD technique). Thereafter, the positive electrode 1, the separator 14, and the negative electrode 2 are assembled and positioned as shown in FIG. 1(a).

It is considered that the film formation mechanism by AD technique involves generation and bonding of new surfaces associated with collision of the inorganic particles. Specifically, when a source powder of inorganic particles collides with an underlayer (the current collector or an insulating layer formed thereon), the impact causes the primary particles to be deformed flat or crushed into a plurality of particles. Due to this deformation and crushing, new surfaces emerge which are to be involved in new bonds. A "new surface" refers to a surface of a highly active state onto which bonding hands of atoms are instantaneously exposed (dangling bonds). When two such new surfaces come into contact, the primary particles bond directly to the underlayer and to other primary particles. By increasing the kinetic energy by increasing the rate at which the primary particles collide, the particles can be made more significantly flat. As the degree of flatness is increased, a more dense film can be formed.

With this production method, the inorganic particles directly bond to the surface of the positive-electrode active material layer 12 and to other inorganic particles. Since this direct bond is stronger than any binder-based adhesion, the inorganic insulating layer of the present embodiment has an increased adherence as compared to the case where bonding is realized by a binder. The determination as to whether the inorganic insulating layer contains a binder or not can be made by analyzing the presence or absence of resin components in the inorganic insulating layer. Specifically, the determination may be made by examining whether C, F, and the like which are constituent elements of a binder are significantly contained in the inorganic insulating layer or not, based on an element map within the inorganic insulating layer via e.g. EPMA.

Now, an experiment which was performed in order to demonstrate the principles of the present invention will be described. In this experiment, as the positive electrode, the following three types were used: a mere copper plate not having an inorganic insulating layer (positive electrode (a)); a copper electrode having an inorganic insulating layer formed on its surface, the inorganic insulating layer containing a binder (positive electrode (b)); and a copper electrode having an inorganic insulating layer formed on its surface, the inorganic insulating layer containing no binder (positive electrode (c)). The inorganic insulating layer on positive electrode (b) was formed by applying a slurry containing alumina particles and a binder onto a copper plate. The inorganic insulating layer on positive electrode (c) was formed by jetting an aerosol containing alumina particles onto a copper plate by AD technique. As a separator, a polypropylene microporous film having a thickness of 16 μm was used.

A separator was placed between each of the three types of positive electrodes (a) to (c) and a negative electrode, and immersed in an electrolyte solution, thus producing samples (a) to (c). In this state, by using a potentiostat, a potential difference equal to or greater than a dissolution potential of copper was applied between the positive and negative electrodes, and an increase in a faradic current was observed over time. The change over time of the faradic current flowing between the electrodes at this time is shown in FIG. 2.

Figure 2:
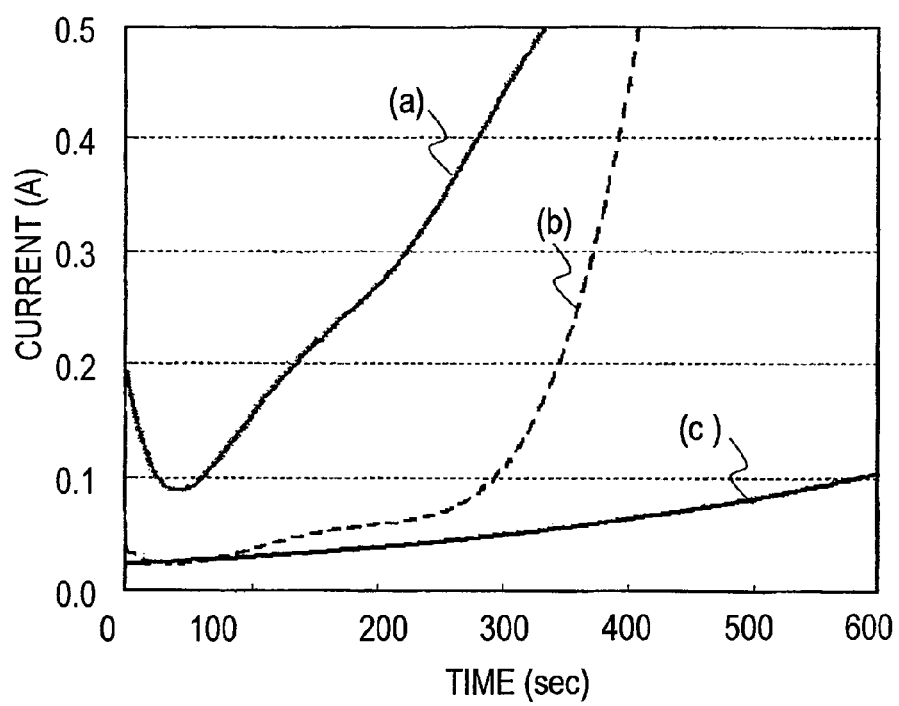
FIG. 2 is a diagram showing results of an experiment performed in order to demonstrate the principles of the present invention.

As shown in FIG. 2, in sample (a), an increase in the current value is soon observed. Since the increase in the faradic current occurs with dissolution of copper from the positive electrode and deposition of copper onto the negative electrode, it can be seen that sample (a) does not have a sufficient short-circuit withstand ability associated with metal deposition. On the other hand, with sample (b), the increase in the current occurs later in time than with sample (a). Furthermore, in sample (c), the increase in the From these results, it was confirmed that a positive electrode having an inorganic insulating layer which contains no binder exhibits a very good short-circuit withstand ability. In samples (a) to (c), copper plates were used as the positive electrode and negative electrode in order to compare only the influences of presence or absence of an electron insulating layer and presence or absence of a binder. Therefore, samples (a) to (c) have a different construction from that of a battery having active material layers.

On the other hand, in a lithium-ion secondary battery shown in FIG. 1(b), the inorganic insulating layer 13 is provided between the separator 14 and the negative electrode 2, rather than between the separator 14 and the positive electrode 1; otherwise, the construction is the same as that in FIG. 1(a).

The inorganic insulating layer 13 of the lithium-ion secondary battery shown in FIG. 1(b) is formed by jetting an aerosol containing a plurality of inorganic particles onto the surface of the negative-electrode active material layer 15 or the separator 14. Thereafter, the positive electrode 1, the separator 14, and the negative electrode 2 are assembled, whereby the lithium-ion secondary battery as shown in FIG. 1(b) is obtained.

In FIGS. 1(a) and (b), the inorganic insulating layer 13 is provided between the separator 14 and either one of the positive electrode 1 and the negative electrode 2. However, inorganic insulating layers 13 may be provided both between the positive electrode 1 and the separator 14 and between the negative electrode 2 and the separator 14.

In FIGS. 1(a) and (b), an electrode can in which to accommodate the electrode group, an electrolyte solution with which to fill the inside of the electrode can, and so on, are omitted from illustration.

In the lithium-ion secondary battery of the present embodiment, the inorganic particles contained in the inorganic insulating layer 13 bond directly to other inorganic particles and to the surface of the positive-electrode active material layer 12, the negative-electrode active material layer 15, or the separator 14. Therefore, as compared to the case of using a binder for adhesion, the inorganic insulating layer 13 has an increased adherence. This makes it possible to avoid a problem of losing a portion of the inorganic insulating layer 13 in the step of processing the positive electrode 1, the negative electrode 2, and the separator 14, which would cause short-circuiting between the electrodes.

Moreover, since the inorganic insulating layer 13 contains no binder, the problem of intermixing of the inorganic insulating layer 13 with the positive-electrode active material layer 12 or the negative-electrode active material layer 15 does not occur. Therefore, it is possible to form the inorganic insulating layer 13 without considering the types of binders to be used for the positive-electrode active material layer 12 and the negative-electrode active material layer 15. In particular, although it has conventionally been difficult to form an inorganic insulating layer on a positive-electrode active material layer, the inorganic insulating layer 13 of the present embodiment can be formed on the positive-electrode active material layer 12 with a high adherence, regardless of what sort of binder is used for the positive-electrode active material layer 12.

Moreover, since the inorganic insulating layer 13 contains no binder but is composed substantially only of inorganic particles, there is an advantage in that the capacity per volume of the inorganic insulating layer 13 is increased.

Figure 3:
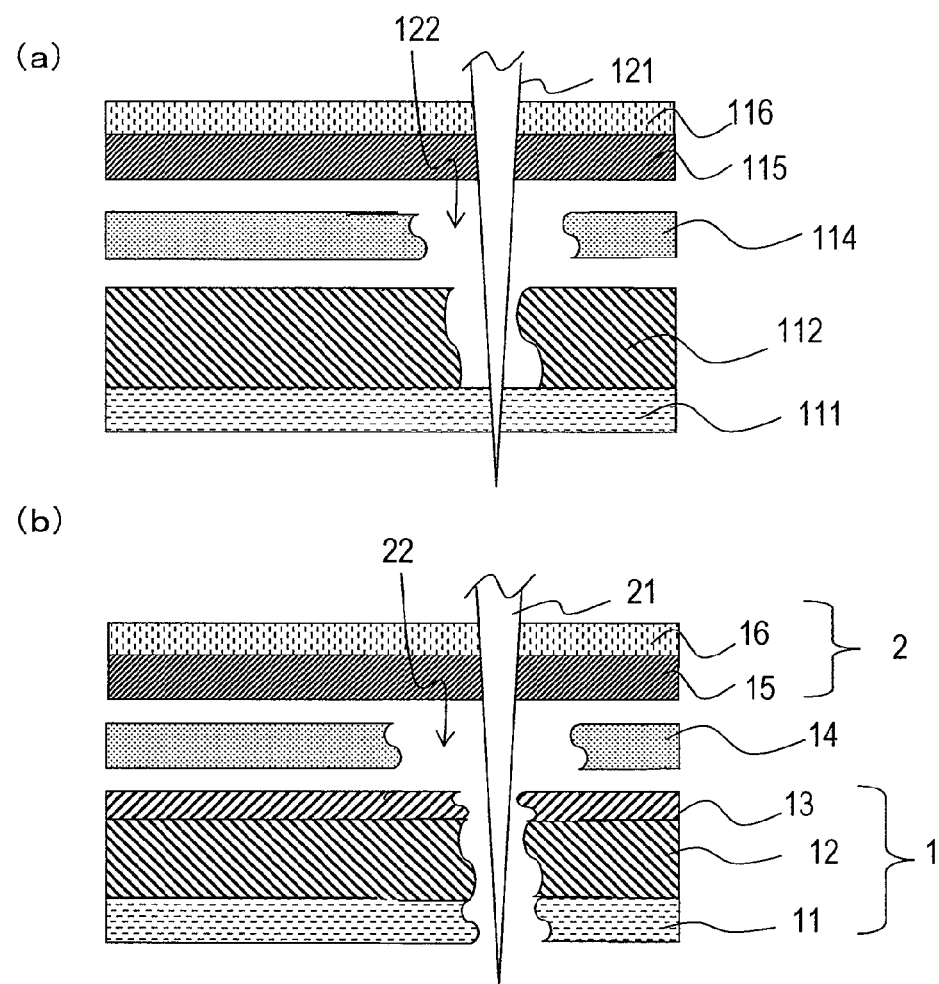
FIGS. 3(a) and 3(b) are cross-sectional views schematically showing states within batteries when protrusion having a sharp shape such as a nail penetrates each battery.

Furthermore, forming the inorganic insulating layer on the positive-electrode active material layer 12 provides the following advantage. FIGS. 3(a) and (b) are cross-sectional views schematically showing states within batteries when a protrusion having a sharp shape such as a nail penetrates each battery. FIG. 3(a) shows a conventional battery in which no inorganic insulating layer 13 is provided, whereas FIG. 3(b) shows the battery of the present embodiment. In the conventional battery shown in FIG. 3(a), for example, the positive-electrode current collector 111 is aluminum; the positive-electrode active material layer 112 is lithium nickelate; the separator 114 is a microporous film of an olefin-type resin; the negative-electrode active material layer 115 is carbon; and the negative-electrode current collector 116 is copper. As shown in FIG. 3(a), in the conventional battery, when a protrusion 121 penetrates the battery, a Joule heat occurs around the protrusion 121 to cause the separator 114 to melt and shrink. As a result of this, a hole 122 emerges around the protrusion 121 in the separator 114. If the amount of generated heat is large, the hole 122 of the separator 114 may expand to be large.

On the other hand, in the battery shown in FIG. 3(b), the positive-electrode current collector 11, the positive-electrode active material layer 12, the separator 14, the negative-electrode active material layer 15, and the negative-electrode current collector 16 are composed of the same materials as those of the battery shown in FIG. 3(a), and the inorganic insulating layer 13 shown in FIG. 3(b) is composed of alumina. As shown in FIG. 3(b), in the battery of the present embodiment, when a protrusion 21 penetrates the battery, a Joule heat occurs around the protrusion 21 to cause the separator 14 to melt and shrink, as in the conventional case. As a result of this, a hole 22 emerges around the protrusion 21 in the separator 14. Although the hole 22 of the separator 14 will expand since the Joule heat keeps being generated, the inorganic insulating layer 13 provided between the separator 14 and the positive-electrode active material layer 12 makes short-circuiting between the positive-electrode active material layer 12 and the negative-electrode active material 15 unlikely to occur even if the separator 14 shrinks.

Next, the inorganic insulating layer 13 will be described in detail. The inorganic insulating layer 13 may be composed of a single layer or a plurality of layers.

As the inorganic particles with which to form the inorganic insulating layer 13, porous inorganic particles which are insulative are used. For example, by using inorganic particles whose main component is alumina, the inorganic insulating layer 13 may be formed with aerosol deposition technique. In this case, it is desirable that the alumina particles (primary particles) have an average particle size of no less than 0.05 μm and no more than 10 μm. If the particle size of the alumina particles is less than 0.05 μm, due to the insufficient weight of the particles, there is not enough kinetic energy for bonding with the surface of the positive-electrode active material layer 12, the negative-electrode active material layer 15, or the separator 14, thus making it difficult for the alumina particles to deposit. Conversely, if the particle size of the alumina particles exceeds 10 μm, a phenomenon will occur where the alumina particles grinds off the surface of the positive-electrode active material layer 12, the negative-electrode active material layer 15, or the separator 14, thus making it difficult for the inorganic insulating layer 13 to be formed.

More desirably, the average particle size of the alumina particles is in the neighborhood of 1.0 to 1.5 μm. If the average particle size of the alumina particles is in this range, the adhesion efficiency of the alumina particles is further enhanced. Moreover, other than alumina, $ZrO_2$, $TiO_2$, $Y_2O_3$, $SiO_2$, MgO, AlN, ZrN, TiN, YN, $Si_3N_4$, $Mg_3N_2$, $AlF_3$, $CaF_2$, a lithium phosphate-type solid electrolyte, or the like can be used as the electron-insulative inorganic particles. Among these, one kind may be used by itself, or two or more kinds may be used in combination. Moreover, the inorganic insulating layer 13 may be formed by stacking a plurality of layers composed of different kinds of inorganic particles. Furthermore, in the case of using two or more kinds of inorganic particles, the average particle size of each kind of inorganic particles may be different.

Preferably, the inorganic insulating layer 13 has a packing fraction of no less than 40% and no more than 95%. More preferably, it is no less than 70% and no more than 90%. When the packing fraction of the inorganic insulating layer is 95% or less (i.e., porous), and more preferably 90 percent or less, the ion conductivity between the positive electrode and the negative electrode of a battery in which the electrode 10 is used is adjusted to fall in an appropriate range. Moreover, when the packing fraction of the inorganic insulating layer 13 is 40% or more, the bond between inorganic particles within the inorganic insulating layer 13 and the bond between the inorganic particles and the underlayer can be firmly maintained.

The packing fraction of the inorganic insulating layer 13 is a value obtained by dividing the bulk density of the inorganic insulating layer 13 by the true density of a material composing the inorganic insulating layer 13. A bulk density is a value obtained by dividing the mass of the inorganic insulating layer 13 by the volume of the inorganic insulating layer 13. The volume of the inorganic insulating layer 13 can be calculated by measuring the film formation area and the film thickness, and multiplying them. In some cases, the bulk density can be determined by thin film x-ray reflectivity method. On the other hand, a true density means weight per unit volumetric capacity in the absence of voids. According to literature (A Handbook Of Ceramic Engineering (2nd edition)•advanced), the true densities of alumina, mullite, silica, titania, and magnesia are 3.98, 3.19, 1.96, 4.27, and 3.585, respectively. Note that packing fraction is synonymous with relative density.

Although there is no particular limitation, the thickness of the inorganic insulating layer 13 may be no less than 0.1 μm and no more than 100 μm, for example. From the standpoint of adequately realizing the function of the inorganic insulating layer 13 to achieve an improved reliability, and maintaining the design capacity of the battery, it is desirably no less than 0.3 μm and no more than 5 μm. Note that an insulating film which is formed by sputtering technique, for example, will have a large internal stress, and therefore it is difficult to employ a sputtering technique to form a film which is as thick as 0.3 μm or more. Moreover, a high ion permeability can be maintained so long as the thickness of the inorganic insulating layer 13 is 5 μm or less.

Also in the case of forming an inorganic insulating layer 13 having a multilayer structure, it is desirable that the total thickness is no less than 0.3 μm and no more than 5 μm. It is more preferable if the thickness of the inorganic insulating layer 13 is 1 μm or more.

As shown in FIGS. 1(a) and (b), in order to form the inorganic insulating layer 13 between the positive electrode 1 and the negative electrode 2, the inorganic insulating layer 13 may be formed on the surface of any of the positive electrode 1, the negative electrode 2, and the separator 14, and thereafter these may be assembled. Hereinafter, an embodiment where the inorganic insulating layer 13 is formed on the surface of the positive electrode 1 will be described first.

Figure 4:
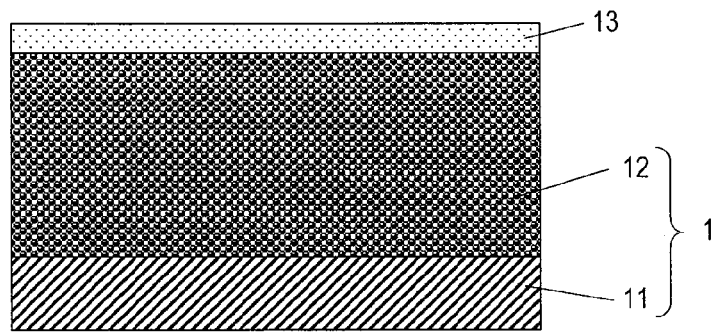
Figure 4:

FIG. 4(a) is a cross-sectional view showing a positive electrode of the lithium-ion secondary battery of the present embodiment. As shown in FIG. 4(a), the positive electrode 1 in the present embodiment includes the positive-electrode current collector 11 and the positive-electrode active material layer 12, and on the surface of the positive electrode 1, at least one layer of porous inorganic insulating layer 13 which is composed of a plurality of inorganic particles and contains no binder is formed.

In the case where the inorganic insulating layer 13 is formed on the surface of the positive electrode 1 in this manner, a lithium-ion secondary battery as shown in FIG. 3(a) can be obtained by allowing the face on which the inorganic insulating layer 13 is formed to oppose the separator 14.

Although the inorganic insulating layer 13 is formed on the surface of the positive electrode 1 in FIG. 4(a), the inorganic insulating layer 13 may instead be formed on the surface of the negative electrode 2. In this case, a lithium-ion secondary battery as shown in FIG. 3(b) can be obtained by allowing the face on which the inorganic insulating layer 13 is formed to oppose the separator 14.

FIG. 4(b) is a diagram representing an image of a state where the inorganic insulating layer 13 is formed on the surface of a positive electrode of a lithium-ion secondary battery. As shown in FIG. 4(b), the positive-electrode active material layer 12 is formed of a plurality of particles 18 bonding together. It can be seen that the inorganic insulating layer 13 is formed along the ruggednesses of the surface of the positive-electrode active material layer 12.

The positive-electrode active material layer 12 and the negative-electrode active material layer 15 in the present embodiment are generic active material layers, containing an active material, a binder, and a conductive agent.

As the substance with which to form the positive-electrode active material layer 12, complex oxides such as lithium cobaltate, a modification of lithium cobaltate, lithium nickelate, a modification of lithium nickelate, lithium manganate, a modification of lithium manganate, and the like can be used. Within each modification, some may contain an element such as aluminum or magnesium. Moreover, as the material with which to form the positive-electrode active material layer 12, a complex oxide containing at least two kinds from among cobalt, nickel, and manganese may be used, and two or more kinds of complex oxides may be used in combination.

There is no particular limitation as to the type of the binder to be used for the positive-electrode active material layer 12. PTFE (tetrafluoroethylene resin), modified acrylonitrile rubber particles, PVDF (polyvinylidene fluoride), and the like may be used. Desirably, PTFE or the like is used in combination with carboxymethyl cellulose, polyethylene oxide, modified acrylonitrile rubber or the like which serves as a thickening agent of the source material paste for the positive electrode mixture layer. By itself, PVDF functions both as a binder and as a thickening agent.

As the positive-electrode current collector 11, an aluminum foil is used, for example. An aluminum foil having a thickness of 5 to 20 μm, which is generally commercially-available, may be used.

As the conductive agent, acetylene black, various graphites, and the like may be used. One of these may be used by itself, or two or more kinds of them may be used in combination.

Although it is commonplace to use various natural graphites or various artificial graphites for the negative-electrode active material layer 15, it is possible to use a silicon-containing complex material, such as silicide, or various alloy materials. For example, at least one kind selected from the group consisting of elemental silicon, a silicon alloy, a compound containing silicon and oxygen, a compound containing silicon and nitrogen, elemental tin, a tin alloy, a compound containing tin and oxygen, and a compound containing tin and nitrogen is desirably used.

Examples of silicon alloys include $SiB_4$, $SiB_6$, $Mg_2Si$, $Ni_2Si$, $TiSi_2$, $MoSi_2$, $CoSi_2$, $NiSi_2$, $CaSi_2$, $CrSi_2$, $Cu_5Si$, $FeSi_2$, $MnSi_2$, $NbSi_2$, $TaSi_2$, $VSi_2$, $WSi_2$, $ZnSi_2$, and SiC.

Examples of compounds containing silicon and oxygen include $Si_2N_2O$, $SiO_x (0<x\leq2)$, $SnSiO_3$, and LiSiO.

Examples of compounds containing silicon and nitrogen include $Si_3N_4$ and $Si_2N_2O$.

Examples of tin alloys include $Mg_2Sn$.

Examples of compounds containing tin and oxygen include $SnO_x (0<x\leq2)$ and $SnSiO_3$.

Examples of compounds containing tin and nitrogen include $Sn_3N_4$ and $Sn_2N_2O$.

As the negative-electrode current collector 16, a copper foil or a nickel foil having a thickness of 5 to 50 μm may be used, for example.

Next, an embodiment where the inorganic insulating layer 13 is formed on the surface of the separator 14 will be described.

Figure 5:
FIG. 5 is a diagram showing a separator to be used for a lithium-ion secondary battery according to the present invention.

FIG. 5 is a diagram showing a separator used for a lithium-ion secondary battery according to the present invention. The separator according to the present embodiment includes a separator 14 and an inorganic insulating layer 13 provided on the surface of the separator 14. Although the inorganic insulating layer 13 is formed only on the upper face of the separator 14 in FIG. 5, inorganic insulating layers 13 may be formed on the upper face and lower face of the separator 14.

Thus, in the case where the inorganic insulating layer 13 is formed on the surface of the separator 14, lithium-ion secondary batteries as shown in FIGS. 1(a) and (b) can be obtained by allowing the face on which the inorganic insulating layer 13 is formed to oppose at least one of the positive-electrode active material layer 12 and the negative-electrode active material layer 15.

As the separator 14, it is commonplace to use a microporous film which is composed of a polyolefin-type resin such as polyethylene or polypropylene, although there is no particular limitation. The microporous film may be a single-layered film which is composed of one kind of polyolefin-type resin or a multilayer film composed of two or more kinds of polyolefin-type resin.

Next, a method of forming the inorganic insulating layer 13 by aerosol deposition technique will be describe dispose.

Figure 6:
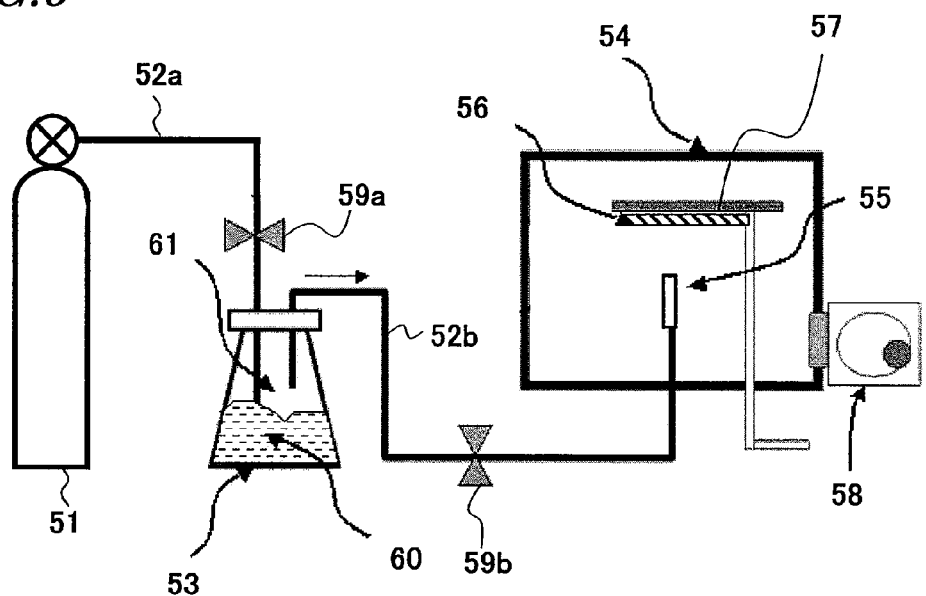
FIG. 6 is a diagram representing a schematic illustration of an aerosol deposition apparatus which is used for forming an inorganic insulating layer according to an embodiment.

FIG. 6 represents a schematic illustration of an aerosol deposition apparatus to be used for forming the inorganic insulating layer according to the embodiment. A gas cylinder 51 shown in FIG. 6 stores a gas for generating an aerosol. The gas cylinder 51 is connected to an aerosol generator 53 via a pipe 52a, and the pipe 52a is drawn to the inside of the aerosol generator 53. Inside the aerosol generator 53, a certain amount of alumina particles 60 is provided. A tip end of the pipe 52a is inserted in the deposit layer of alumina particles 60. Another pipe 52b connected to the aerosol generator 53 is connected to a film formation chamber 54, and an end of the pipe 52b is connected to a jet nozzle 55 inside the film formation chamber 54.

Inside the film formation chamber 54, a substrate holder 57 holds a substrate 56, the substrate 56 being located to oppose the jet nozzle 55. For example, in the case where an inorganic insulating layer is formed on the surface of the positive electrode, a positive electrode having a positive-electrode active material layer formed on the surface of whose current collector is placed as the substrate 56. The film formation chamber 54 is connected to an evacuation pump 58 for adjusting the degree of vacuum inside the film formation chamber 54.

Although omitted from illustration, a film formation apparatus for forming the electrodes according to the present embodiment includes a mechanism for moving the substrate holder 57 along a lateral direction or a longitudinal direction (the lateral direction or the longitudinal direction in a plane of the substrate holder 57 opposing the jet nozzle 55) at a certain speed. By forming the film formation while moving the substrate holder 57 along the longitudinal direction and the lateral direction, an active material layer having a desired area can be formed on the substrate 56.

In the step of forming the inorganic insulating layer 13, first, the gas within the gas cylinder 51 is introduced to the aerosol generator 53 via the pipe 52a, and alumina particles as the inorganic insulating particles 60 are swirled up in the aerosol generator 53, whereby an aerosol having the alumina particles dispersed in the gas is generated. Via the pipe 52b, the resultant aerosol is jetted from the jet nozzle 55 toward substrate 56. The jet rate of the aerosol fluctuates under the influences of the shape of the jet nozzle 55, the length and inner diameter of the pipe 52b, the internal gas pressure in the gas cylinder 51, the displacement (internal pressure in the film formation chamber 54) of the evacuation pump 58, and the like. For example, assuming that the aerosol generator 53 has an internal pressure of several dozen thousand Pa; the film formation chamber 54 has an internal pressure of several hundred Pa; and the orifice of the jet nozzle has the shape of a circle with an inner diameter of 1 mm, the jet rate of the aerosol can be set to several hundred m/sec based on an internal pressure difference between the aerosol generator 53 and the film formation chamber 54.

The alumina particles in the aerosol which have obtained a kinetic energy by being accelerated collide against the substrate 56, and are finely crushed by the impact energy. These crushed particles are bonded to the substrate 56, and also to one another, thus forming an alumina layer. Even if they are not crushed into a plurality of particles, grain boundaries may be formed within the primary particles, such that the grain boundaries partition one primary particle into a plurality of regions.

For example, by maintaining the internal pressure of the film formation chamber 54 at 100 Pa and the internal pressure in the aerosol generator at 50000 Pa, an alumina layer having a thickness of about 3 μm can be formed on the positive-electrode current collector.

As a gas for use in the generation of the aerosol, for example, an inert gas such as argon or helium, oxygen gas, nitrogen gas, carbonic acid gas, dry air, or a gaseous mixture thereof may be used. Moreover, depending on the material, a reductant gas such as hydrogen gas may be used.

Thereafter, the separator is sandwiched by a positive electrode and a negative electrode, thus forming an electrode group. Then, after the electrode group is accommodated in a battery can, the battery can is filled with a nonaqueous electrolyte.

According to the production method of the present embodiment, alumina particles can be directly bonded to other alumina particles or to the surface of the substrate 56. Therefore, as compared to the case of using a binder for adhesion, the inorganic insulating layer has an increased adherence. This makes it possible to avoid a problem of losing a portion of the inorganic insulating layer in the step of processing the positive electrode, the negative electrode, and the separator, which would cause short-circuiting between the electrodes.

Second Embodiment

Next, an embodiment will be described in which an organic polymer-type separator is not provided between the positive electrode and the negative electrode.

Figure 7:
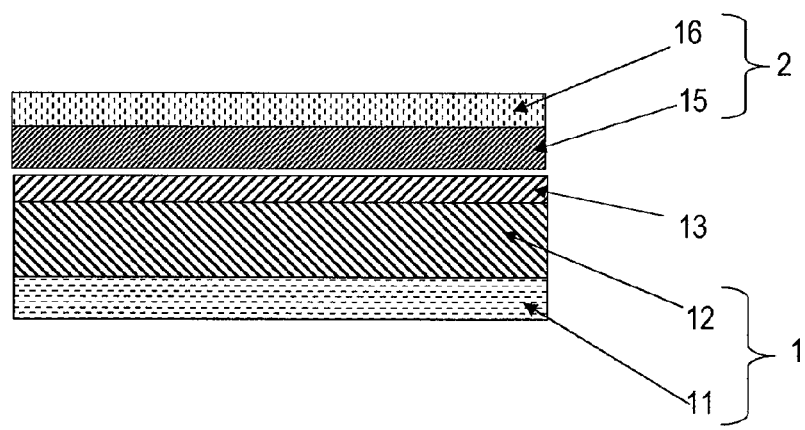
FIG. 7 is a cross-sectional view showing a second embodiment of a lithium-ion secondary battery according to the present invention.

FIG. 7 is a cross-sectional view showing a second embodiment of the lithium-ion secondary battery according to the present invention. Although FIG. 7 shows a main portion of a lithium-ion secondary battery, the lithium-ion secondary battery of the present embodiment may be a wound-type battery such as a prismatic-type battery or a cylindrical-type battery, or may be a stacked-type battery.

The lithium-ion secondary battery of the present embodiment includes a positive electrode 1 and a negative electrode 2, and no separator. The positive electrode 1 includes a positive-electrode current collector 11 composed of e.g., a foil or sheet of aluminum, and a positive-electrode active material layer 12 containing e.g., lithium complex oxide as a positive-electrode active material, the positive-electrode active material layer 12 being formed on the surface (upper face) of the positive-electrode current collector 11. On the surface (upper face) of the positive-electrode active material layer 12, an inorganic insulating film 13 composed of e.g. alumina is formed. On the other hand, the negative electrode 2 includes a negative-electrode current collector 16 composed of e.g. a copper foil or a nickel foil, and a negative-electrode active material layer 15 containing e.g. a graphite or a lithium alloy as a negative-electrode active material, the negative-electrode active material layer 15 being formed on the surface (lower face) of the negative-electrode current collector 16.

In the present embodiment, since an organic polymer-type separator is not provided, insulation between the positive electrode 1 and the negative electrode 2 needs to be ensured based only on the inorganic insulating layer 13. According to results of a study by the inventors, it is preferable that the packing fraction of the inorganic insulating layer 13 is no less than 80% and no more than 92%. When the packing fraction of the inorganic insulating layer 13 is 80% or more, impurities are unlikely to be accumulated in the vacancies of the inorganic insulating layer 13. Therefore, even if the impurities are conductors, it is possible to avoid a problem of the electrons moving between the electrodes via the impurities accumulated in the vacancies. When the packing fraction of the inorganic insulating layer 13 is 92% or less, a high ion conductivity can be ensured.

For example, the packing fraction of a film which is formed by sputtering technique is generally greater than 95%. Such a film will not sufficiently allow ions to pass through at room temperature. On the other hand, the packing fraction of a film which is formed by CVD technique or coating technique at room temperature, is about 40 to 60%, and it will be difficult to ensure a sufficient insulation ability between the positive electrode and the negative electrode unless a film thickness of 20 μm or more is employed.

Although there is no particular limitation, the thickness of the inorganic insulating layer 13 may be no less than 0.1 μm and no more than 100 μm, for example. The thickness of the inorganic insulating layer 13 is preferably no less than 5 μm and no more than 20 μm, in which case a sufficient insulation between the positive electrode 1 and the negative electrode 2 is achieved based only on the inorganic insulating layer 13. If the thickness of the inorganic insulating layer 13 is smaller than 5 μm, it becomes difficult to maintain a sufficient insulation ability between the positive electrode 1 and the negative electrode 2. If the thickness of the inorganic insulating layer 13 exceeds 20 μm, the micropores within the film will be small and scarce, thus making it difficult to ensure a sufficient ion permeability.

In the present embodiment, effects similar to those of the first embodiment can be obtained. In addition, since no separator is provided, the distance between the positive electrode 1 and the negative electrode 2 can be made short. This provides an advantage of enabling downsizing of the device.

Third Embodiment

Next, an embodiment will be described in which inorganic insulating layers are formed both between the positive electrode and the separator and between the negative electrode and the separator.

Figure 8:
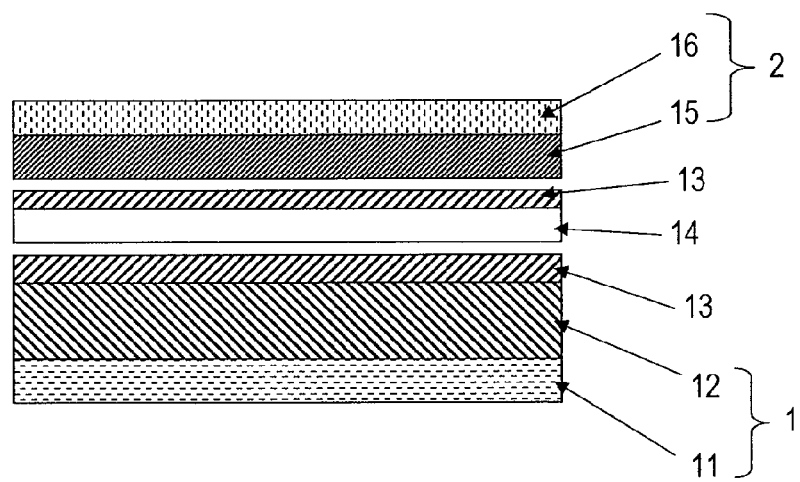
FIG. 8 is a cross-sectional view showing a third embodiment of a lithium-ion secondary battery according to the present invention.

FIG. 8 is a cross-sectional view showing a third embodiment of the lithium-ion secondary battery according to the present invention. Although FIG. 8 shows a main portion of a lithium-ion secondary battery, the lithium-ion secondary battery of the present embodiment may be a wound-type battery such as a prismatic-type battery or a cylindrical-type battery, or may be a stacked-type battery.

The lithium-ion secondary battery of the present embodiment includes a positive-electrode current collector 11 composed of e.g., a foil or sheet of aluminum, and a positive-electrode active material layer 12 containing e.g., lithium complex oxide as a positive-electrode active material, the positive-electrode active material layer 12 being formed on the surface (upper face) of the positive-electrode current collector 11. On the surface (upper face) of the positive-electrode active material layer 12, an inorganic insulating film 13 composed of e.g. alumina is formed. On the other hand, the negative electrode 2 includes a negative-electrode current collector 16 composed of e.g. a copper foil or a nickel foil, and a negative-electrode active material layer 15 containing e.g. a graphite or a lithium alloy as a negative-electrode active material, the negative-electrode active material layer 15 being formed on the surface (lower face) of the negative-electrode current collector 16. A separator 14 is placed between the positive electrode 1 and the negative electrode 2, and an inorganic insulating layer 13 is formed on a surface of the separator facing the negative electrode 2. In the present embodiment, the two inorganic insulating layers 13 provide insulation between the positive electrode 1 and the separator 14, and between the negative electrode 2 and the separator 14. Preferably, the inorganic insulating layer 13 of the present embodiment has packing fraction and thickness ranges similar to those of the inorganic insulating layer 13 in the first embodiment.

Next, a method of forming the inorganic insulating layer 13 on the separator 14 will be described. Using the aerosol deposition apparatus shown in FIG. 6, alumina is provided in the aerosol generator 53 as inorganic particles 60. As the substrate 56, a polyethylene separator manufactured by Asahi Kasei Corporation is fixed onto the substrate holder 57 in the film formation chamber 54. In this state, a gas is introduced to the aerosol generator 53 from the gas cylinder 51 to generate an aerosol. By jetting the aerosol onto the surface of the substrate 56 (separator), an inorganic insulating layer 13 having a thickness of 2 μm is formed. The area in which film formation occurs is determined based on the area of the negative electrode opposing it within the battery. For example, the film formation may be allowed in an area which is slightly larger than the area of the negative electrode. As for the film formation conditions, the internal pressure of the film formation chamber 54 may be 100 Pa, and helium may be used as a carrier gas. The packing fraction of the inorganic insulating layer 13 may be 60%, for example.

In the present embodiment, effects similar to those of the first embodiment can be obtained. Furthermore, since inorganic insulating layers 13 are formed both between the positive electrode 1 and the separator 14 and between the negative electrode 2 and the separator 14, short-circuiting between the electrodes can be prevented with an increased certainty.

Fourth Embodiment

Figure 9:
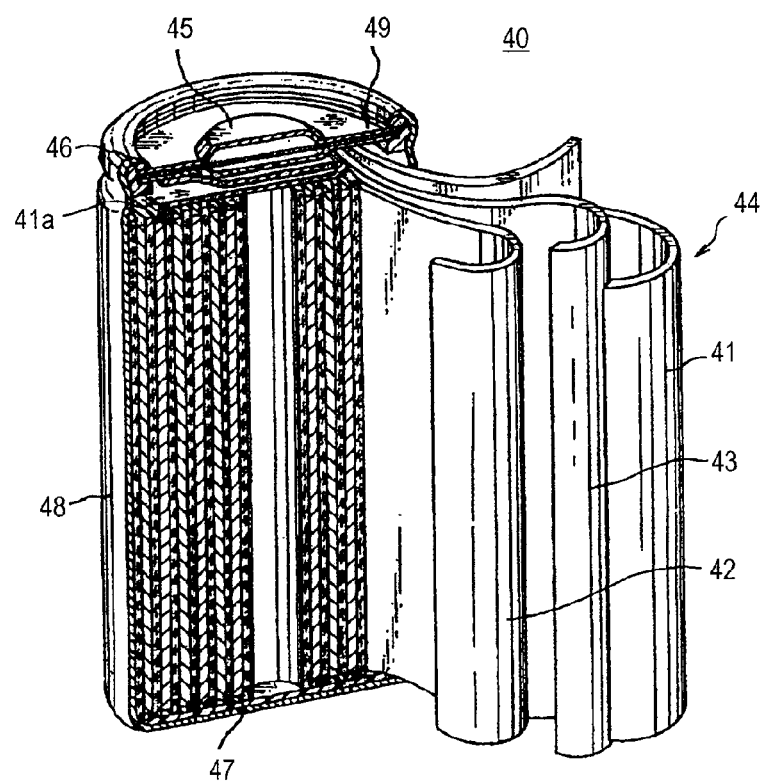
FIG. 9 is a cross-sectional view showing a fourth embodiment of a lithium-ion secondary battery according to the present invention.

Next, an embodiment of a cylindrical lithium-ion secondary battery will be described. FIG. 9 is a cross-sectional view showing a fourth embodiment of a lithium-ion secondary battery according to the present invention. A cylindrical-type battery 40 of the present embodiment includes a group of cylindrical electrodes 44, and a battery can 48 accommodating the same. The electrode group 44 is structured so that a strip-like positive electrode 1 and a negative electrode 2 are wound together with a separator 43 placed therebetween. Although omitted from illustration, an inorganic insulating layer is formed on the surface of the positive electrode 1, the negative electrode 2, or the separator 43. The electrode group 44 is impregnated with an electrolyte (not shown) which conducts lithium ions. An aperture of the battery can 48 is closed with a sealing plate 49 having a positive terminal 45. The positive electrode 1 is connected to one end of an aluminum positive electrode lead 41a, whose other end is connected to the rear face of the sealing plate 49. A polypropylene insulation packing 46 is disposed around the brim of the sealing plate 49. The negative electrode plate 42 is connected to one end of a copper negative electrode lead (not shown), whose other end is connected to the battery can 48. An upper insulation ring (not shown) and a lower insulation ring 47 are provided on the top and the bottom, respectively, of the electrode group 44.

Preferably, the inorganic insulating layer of the present embodiment has similar packing fraction and thickness to those of the inorganic insulating layer 13 of the first embodiment. However, a separator 43 may not necessarily be provided in the present embodiment, in which case the inorganic insulating layer 13 preferably has similar packing fraction and thickness to those in the second embodiment.

In the production method for a cylindrical-type battery, after performing a step of producing an elongated positive electrode 1 and an elongated negative electrode 2 (electrode workpiece), a cutting step for working them into predetermined electrode shapes, and so on, the positive electrode 1 and the negative electrode 2 are wound onto a core together with the separator 43. Usually, these steps are performed by allowing the positive electrode 1 and the negative electrode 2 to travel by using travel path elements such as a supply roll, a take-up roll, guide rollers, or the like. Conventionally, during the traveling step, a portion of the inorganic insulating layer having been formed through application onto the surface of an active material layer may occasionally chip off. However, in the present embodiment featuring a method of allowing inorganic particles to directly bond to one another, problems such as a portion of the inorganic insulating layer chipping off are unlikely to occur, whereby an improved reliability, e.g., short-circuit withstand ability, can be provided.

As an electrolyte solution composed of a nonaqueous solvent, various lithium salts such as $LiPF_6$ and $LiBF_4$ can be employed as the solute. As the nonaqueous solvent, ethylene carbonate, propylene carbonate, dimethyl carbonate, diethyl carbonate, methyl ethyl carbonate, and the like are desirably used, although these are not limitations. One kind of nonaqueous solvent may be used by itself, or two or more kinds may be used in combination.

Fifth Embodiment

Figure 10:
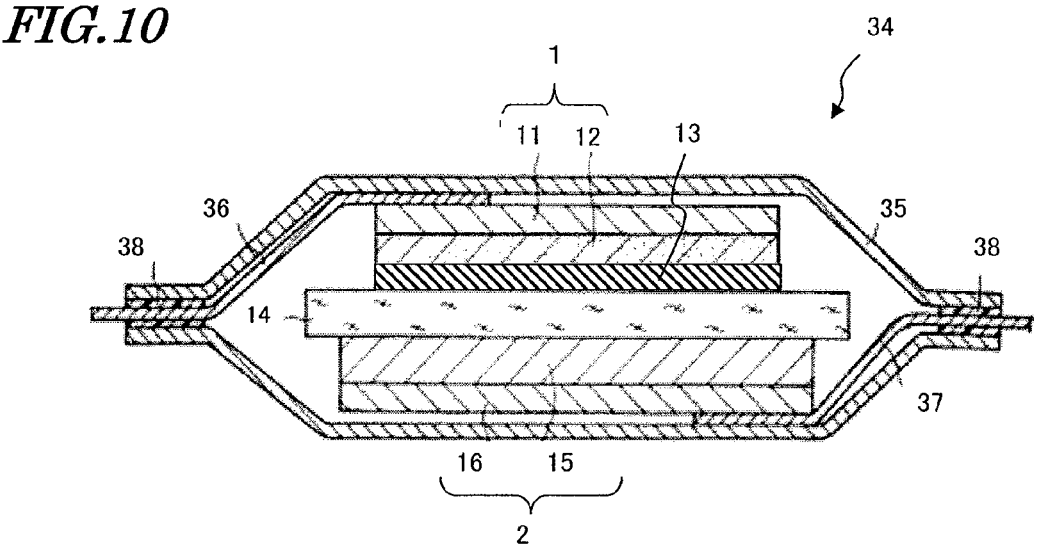
FIG. 10 is a cross-sectional view showing a fifth embodiment of a lithium-ion secondary battery according to the present invention.

Next, an embodiment of a stacked-type lithium-ion secondary battery will be described. FIG. 10 is a cross-sectional view showing a fifth embodiment of the lithium-ion secondary battery according to the present invention. As shown in FIG. 10, a stacked-type battery 34 of the present embodiment includes a positive electrode 1 having an inorganic insulating layer 13 on its surface, a negative electrode 2 opposing the positive electrode 1, and a separator 14 sandwiched by the positive electrode 1 and the negative electrode 2. The positive electrode 1 includes a positive-electrode current collector 11 composed of e.g., a foil or sheet of aluminum, a positive-electrode active material layer 12 containing e.g., lithium complex oxide as a positive-electrode active material, and the inorganic insulating layer 13 composed of e.g. alumina. On the other hand, the negative electrode 2 includes a negative-electrode current collector 16 composed of e.g. a copper foil or a nickel foil and a negative-electrode active material layer 15 containing e.g. a graphite or a lithium alloy as a negative-electrode active material.

The separator 14 contains an electrolytic solution. The positive electrode 1, the negative electrode 2, and the separator 14 are accommodated in an outer case 35, and an electrolytic solution 34 fills the inside of the outer case 35. Both ends of the outer case 35 are sealed with a resin material 38, the resin material 38 serving to fix a positive electrode lead 36 and a negative electrode lead 37. The positive electrode lead 36 and the negative electrode lead 37 are respectively present between the outer case 35 and the current collectors 11 and 16, thus fixing the positive electrode 1 and the negative electrode 2.

The positive-electrode active material layer 12 is formed by applying a mixture of an organic solvent in which a binder (binder agent) is dissolved and a lithium complex oxide as the positive-electrode active material onto the positive-electrode current collector 11, for example. On the other hand, the inorganic insulating layer 13 is formed by supplying an aerosol containing inorganic particles onto the surface of the positive-electrode active material layer 12. Since the surface of the positive-electrode active material layer 12 formed by coating technique has ruggednesses, when a material of the inorganic insulating layer 13 is deposited on its surface, micropores are formed within the inorganic insulating layer 13.

The inorganic insulating layer 13 is typically formed by AD technique, and is firmly bonded to underlayers (the positive-electrode active material layer 12 and the negative-electrode active material layer 15) thereof. Its state of bonding can be analyzed by observing a cross section with an electron microscope (cross-sectional TEM observation).

In the present embodiment, the inorganic insulating layer 13 contains no binder, and the inorganic particles contained in the inorganic insulating layer 13 directly bond to other inorganic particles and to the surfaces of the active material layers. Therefore, as compared to the case of using a binder for adhesion, the inorganic insulating layer 13 has an increased adherence. This makes it possible to avoid a problem of losing a portion of the inorganic insulating layer 13 in the step of processing the positive electrode 1 and the negative electrode 2, which would cause short-circuiting between the electrodes.

Preferably, the inorganic insulating layer 13 of the present embodiment has similar packing fraction and thickness to those of the inorganic insulating layer 13 of the first embodiment.

Conventionally-used separators usually have a thickness of about 15 µm to 30 µm. By using a separator of this thickness and forming the inorganic insulating layer 13, the distance between the positive-electrode active material layer 12 and the negative-electrode active material layer 15 is increased correspondingly to the inorganic insulating layer 13. Therefore, the capacitance value is decreased. In order to prevent the decrease in the capacitance value, it is preferable to use a separator having a thickness of no less than 10 µm and no more than 25 µm. In this case, a total of the thickness of the separator 14 and the thickness of the inorganic insulating layer 13 is about the same as the thickness of a conventional separator, so that the distance between the positive-electrode active material layer 12 and the negative-electrode active material layer 15 can be maintained at around the conventionally level.

In the present embodiment, the separator 14 may not necessarily be provided, in which case the inorganic insulating layer 13 preferably has similar packing fraction and thickness to those of the inorganic insulating layer 13 of the second embodiment.

Next, an embodiment of a production method for the lithium-ion secondary battery according to the present invention will be described. In the production method of the present embodiment, a positive-electrode current collector 11 is prepared first. As the positive-electrode current collector 11, an aluminum foil or an aluminum alloy foil is preferably used. However, other than an aluminum foil, any electron conductor that is chemically stable within the battery may be used. For example, a foil or sheet of aluminum, stainless steel, nickel, titanium, carbon, an electrically conductive resin, or the like may be used. Although there is no particular limitation, the thickness of the positive-electrode current collector 11 is from 5 μm to 500 μm, for example.

Next, a material of the positive-electrode active material layer 12 is made into a slurry with a binder (binder agent) and an organic solvent such as N-methylpyrrolidone (NMP), and applied onto the positive-electrode current collector 11; through a drying and rolling steps, the positive-electrode active material layer 12 is formed. As the positive-electrode active material layer 12, a lithium complex oxide film having a thickness of 50 μm may be formed, for example.

The lithium complex oxide film is a film composed of a lithium complex oxide represented by the general formula (1): $Li_xM_{1-y}L_yO_2$, for example. In formula (1), element M is at least one kind selected from the group consisting of Ni and Co, and element L is at least one kind selected from the group consisting of alkaline-earth elements, transition elements other than Ni and Co, rare-earth elements, IIIb group elements, and IVb group elements. More preferably, element L is at least one kind selected from the group consisting of Al, Mn, Ti, Mg, Zr, Nb, Mo, W, and Y. Any such element may be used by itself, or two or more kinds may be used in combination. Among others, element L is preferably Al due to its strong bonding strength with oxygen. When forming any such lithium complex oxide film, an active material with particle diameters of about 0.1 μm to 40 μm is used.

As a binder agent, what is obtained by combining polytetrafluoroethylene (PTFE) or modified acrylonitrile rubber particles with carboxymethyl cellulose (CMC), polyethylene oxide (PEO), or soluble modified acrylonitrile rubber having a thickening effect; polyvinylidene fluoride (PVDF) or a modification thereof; or the like is used. As a conductive agent, acetylene black, Ketjen black, various graphites, or the like is added.

The inorganic insulating layer 13 is formed by jetting inorganic particles, as a source powder, onto the surface of the positive-electrode active material layer 12 together with a carrier gas. A typical method thereof is the AD technique. The source powder for the inorganic insulating layer 13 is typically alumina; otherwise, a substance selected from among silica, titania, magnesia, and mullite may also be used.

For the formation of the inorganic insulating layer 13 by AD technique, a film formation apparatus as shown in FIG. 6 is used, for example. As shown in FIG. 6, within the film formation chamber 54 in a vacuum state, the substrate holder 57 holds a positive electrode plate as the substrate 56. The nozzle 55 for jetting an aerosol is placed within the film formation chamber 54. The nozzle 55 has a jetting opening of a predetermined size, having the shape of a circle or a line with a minute width, the jetting opening being directed toward the positive electrode plate as the substrate 56.

A vacuum pump 58 for adjusting the degree of vacuum within the film formation chamber 54 is connected to the film formation chamber 54. Moreover, the nozzle 55 is connected to the pipe 52b, the pipe 52b being taken out of the film formation chamber 54. A switch valve 59a for controlling the supply of aerosol from the aerosol generation chamber 53 is provided for the pipe 52b. A source powder 60 composed of an insulator such as alumina is retained in the aerosol generation chamber 53, and a pipe 52a to which a carrier gas is supplied is connected to the aerosol generation chamber 53. A switch valve 59a for controlling the supply of the carrier gas is provided for the pipe 52a.

Now, a procedure from aerosol generation to film formation under the AD technique will be described. First, the switch valve 59a is opened to introduce a carrier gas from the pipe 52a into the aerosol generation chamber 53. When the carrier gas has been introduced, the source powder 60 is swirled up in the aerosol generation chamber 53, thus generating an aerosol 61 in which the source powder 60 and the carrier gas are mixed. When the switch valve 59a is opened in this state, the aerosol 61 is supplied to the film formation chamber 54 via the nozzle 55, due to a barometric pressure difference between the inside of the pipe 52b and the inside of the film formation chamber 54. As a result, an inorganic insulating layer 13 (shown in FIG. 10) is formed on the substrate 56.

In the AD technique, at room temperature or a temperature close thereto, an aerosol is supplied onto the surface of the positive-electrode active material layer 12. When the process is performed at a high temperature of 200° C. or more, the positive-electrode active material layer 12 (shown in FIG. 10 and the like) may occasionally be damaged, but the AD technique does not require the process to be performed at such a high temperature, so that the positive-electrode active material layer 12 is not likely to be damaged.

Moreover, when the inorganic insulating layer 13 is formed by AD technique, particles composing the inorganic insulating layer 13 are directly bonded firmly to one another, or the inorganic insulating layer 13 and the positive-electrode active material layer 12 are directly bonded firmly. Therefore, peeling of the inorganic insulating layer 13 itself is suppressed, thus avoiding a decrease in heat conduction via the inorganic insulating layer 13 due to the surface area of the inorganic insulating layer 13 being decreased through peeling. As a result, the phenomenon in which the heat generated inside the battery is kept within the battery interior is suppressed.

As the material of the inorganic insulating layer 13, it is preferable to use primary particles having an average particle size from 0.5 μm to 3 μm.

The average particle size of the material of the source powder 60 can be measured by using a wet laser particle size distribution measurement device manufactured by Micro Track Co., Ltd., for example. In this case, a particle size (median value: D50) which accounts for a cumulative frequency of 50% in the particle diameter distribution of the powder is defined as an average particle size.

Presumably, when the material of the inorganic particles 13 is allowed to collide, the primary particles are deformed or crushed, so that the particle size of the primary particles (inorganic particles) composing the inorganic insulating layer 13 becomes smaller than the particle size of the material. From this standpoint, it is preferable that the particle size of the primary particles (inorganic particles) in the inorganic insulating layer 13 is no less than 0.05 μm and no more than 5 μm. In the case where the primary particles are flat, it is preferable that the shortest of the diameters of the primary particles is 0.05 μm or more, and that the longest of the diameters of the primary particles is 5 μm or less. Moreover, in the case where grain boundaries are created within the primary particles of the material due to the impact upon collision, such that the grain boundaries partition each primary particle into a plurality of regions, it is preferable that the diameter of one region as partitioned by the grain boundaries falls within the aforementioned range.

As the primary particles are deformed flat due to the impact upon collision, an inorganic insulating layer 13 which is dense and yet contains vacancies can be formed. As a result, the ion permeability of the inorganic insulating layer 13 is enhanced, and a lithium-ion secondary battery incorporating the inorganic insulating layer 13 will have good charge-discharge characteristics.

The average particle size of the material of the inorganic insulating layer 13 can be determined through a cross-sectional SEM observation. For example, with a 5000 to 30000× cross-sectional SEM photograph, a value which is calculated from a ten-point average of particle diameters traversing a given region is defined as the average particle size value, by intercept technique.

Next, as the negative-electrode active material layer 15 shown in FIG. 10, a thin film composed of a negative-electrode active material such as silicon is formed on the negative-electrode current collector 16 by vacuum evaporation technique, for example. Other than the vacuum evaporation technique, for example, the negative-electrode active material layer 15 may be formed by applying a negative electrode mixture containing a negative-electrode active material, a binder, and a conductive material onto the negative-electrode current collector 16. The negative-electrode active material layer 15 may be formed of any material that is capable of occluding and releasing lithium; for example, a graphite, a non-graphitizing carbon material, a lithium alloy, a metal oxide, or the like may be used. As the lithium alloy, an alloy containing at least one kind selected from the group consisting of silicon, tin, aluminum, zinc, and magnesium is preferable. As the metal oxide, a silicon-containing oxide or a tin-containing oxide is preferable. The average particle size of the negative-electrode active material is e.g. 1 nm to 30 μm, although there is no particular limitation.

Thereafter, the positive electrode 1, the separator 14, and the negative electrode 2 are combined to form an electrode group. Then, the electrode group is accommodated in a battery can, and the battery can is filled with a nonaqueous electrolyte solution 34.

Although there is no particular limitation to the material of the separator 14, it is commonplace to use an olefin-type resin microporous film such as polyethylene or polypropylene by itself or in combination, and they are preferably used in combination. When a polyolefin-type microporous film is used as the separator 14, the separator 14 will shrink to close the pores contained in the separator 14 (so-called shutdown) at a high temperature (a temperature of about 130° C. or more). As a result of this, ion permeability is eliminated, thus enhancing the safety of the battery.

As a salt for the nonaqueous electrolyte solution 34, various lithium compounds such as $LiPF_6$ and $LiBF_4$ can be used. As the solvent, ethylene carbonate (EC), dimethyl carbonate (DMC), diethyl carbonate (DEC), or ethyl methyl carbonate (EMC) can be used by itself, or they may be used in combination.

In the present embodiment, not only the inorganic insulating layer 13 but also the separator 14 enhances the insulation ability between the positive electrode 1 and the negative electrode 2, thus providing a further enhanced safety.

Regarding Characteristic Evaluations

Next, results of evaluating the characteristics of inorganic insulating layers and batteries will be described.

First Characteristic Evaluation

First, results of comparing an inorganic insulating layer which is formed by aerosol deposition technique and an inorganic insulating layer which is formed by coating technique in terms of strength of adherence will be described. Inorganic insulating layers of Experimental Example 1 to 4 were formed by aerosol deposition technique, and an inorganic insulating layer of Comparative Example 5 was formed by coating technique, and evaluations of these inorganic insulating layers were made.

Experimental Example 1

The inorganic insulating layer of Experimental Example 1 was formed by using an apparatus shown in FIG. 6. As the film formation chamber 54, what was obtained by modifying a commercially-available vapor deposition apparatus (VPC-400 manufactured by ULVAC, Inc.) was used. As the aerosol generator 53, a commercially-available agitator (T.K. AGI HOMO MIXER 2M-03, manufactured by Tokushu Kika Kogyo Co., Ltd.) was used. Note that what is obtained by placing a commercially-available pressure bottle having a volumetric capacity of 1 liter (RBN-S manufactured by KSK Co.) in an ultrasonic cleaner (SUS-103 manufactured by Shimadzu Corporation) may be used as the aerosol generator 53.

As the pipes 52a and 52b, pipes having an inner diameter of 4 mm were used, and a commercially-available nozzle (YB1/8MSSP37 manufactured by Spraying Systems Co., Japan) was used as the jet nozzle 55. At a position 2 mm away from the jet nozzle 55, a commercially-available microscope slide was placed as the substrate 56. A movable system was used such that the substrate holder 57 was capable of moving along the lateral direction and that the jet nozzle 55 was capable of moving along the longitudinal direction. By controlling the amounts of move of the substrate holder 57 and the jet nozzle 55, the area in which film formation occurs was controlled.

In the step of forming an inorganic insulating layer, first, 40 g of alumina powder having an average particle size of 1 μm (manufactured by Wako Pure Chemical Industries, Ltd.) was placed in the aerosol generator 53. Next, with the evacuation pump 58, an evacuation was performed from the film formation chamber 54 all the way to the aerosol generator 53. Then, helium gas was sent into the aerosol generator 53 and agitation was begun, thus generating an aerosol in which alumina particles were dispersed in helium gas, and via the pipe 52b, the aerosol was jetted from the jet nozzle 55 toward the substrate 56. At this time, the flow rate of the helium gas 6 was 13 to 20 liters/minute. The film formation time was 6 hours, and the degree of vacuum within the film formation chamber 54 at film formation was about 50 Pa to 150 Pa.

After moving the jet nozzle by 10 mm along the longitudinal direction at a rate of 7 mm/minute, the substrate holder 57 by 5 mm along the lateral direction at a rate of 7 mm/minute, and this was repeated to form three samples of inorganic insulating layers having an area of 50 mm² and a thickness of 3 μm on a microscope slide as the substrate 56.

The average particle size was measured with Sedigraph 5000-01 apparatus, manufactured by Shimadzu Corporation.

Experimental Example 2

Under the same conditions as those of Experimental Example 1 except for using alumina powder having an average particle size of 0.1 μm, one sample of an inorganic insulating layer having an area of 50 mm² and a thickness of 5 μm was formed on a microscope slide as the substrate 56.

Experimental Example 3

Under the same conditions as those of Experimental Example 1 except for using alumina powder having an average particle size of 2.5 μm, one sample of an inorganic insulating layer having an area of 50 mm² and a thickness of 5 μm was formed on a microscope slide as the substrate 56.

Experimental Example 4

Under the same conditions as those of Experimental Example 1 except for using alumina powder having an average particle size of 10 μm, one sample of an inorganic insulating layer having an area of 50 mm² and a thickness of 5 μm was formed on a microscope slide as the substrate 56.

Comparative Example 1

By using alumina powder having an average particle size of 1 μm, alumina powder 950 g, 625 g of a modified polyacrylonitrile rubber binder agent BM-720H manufactured by ZEON CORPORATION (solid content: 8 weight %), and an appropriate amount of NMP were agitated by a double-arm kneader, thus producing a porous film paste.

Next, after applying the porous film paste onto a commercially-available microscope slide, it was dried to form three samples of inorganic insulating layers having a thickness of 3 μm.

Evaluation 1

Evaluation 1 was conducted by using three samples of inorganic insulating layers of Experimental Example 1 and three samples of inorganic insulating layers (Comparative Example 1) for comparison. Specifically, each sample was cut into a 5 mm×5 mm square, and by using five resultant cut pieces each, the bonding strength between the inorganic insulating layer and the microscope slide was measured. The bonding strength was measured with a film adherence strength tester ROMULUS, manufactured by PHOTOTECHNICA Corp. At this time, an aluminum stud pin with an epoxy adhesive having a 2.7 mm diameter (manufactured by PHOTOTECHNICA) and a ceramic backing plate with an epoxy adhesive sized 8 mm by 8 mm (manufactured by PHOTOTECHNICA) were used.

As a result of the measurement, the inorganic insulating layer of Experimental Example 1 had a bonding strength of 10 to 40 MPa, whereas the inorganic insulating layer of Comparative Example 1 had a bonding strength of 0.1 to 1 MPa, indicating that the inorganic insulating layer of Experimental Example 1 had a bonding strength higher than the bonding strength of the inorganic insulating layer of Comparative Example. From the above results, an inorganic insulating layer which is formed by aerosol deposition technique has an improved adherence with an active material layer, from which it can be expected that a nonaqueous electrolyte secondary battery having an excellent reliability, e.g., short-circuit withstand ability, is provided.

Evaluation 2

Among the inorganic insulating layers according to the present invention, three samples of Experimental Example 2, Experimental Example 3, and Experimental Example 4 were evaluated with a method similar to that of evaluation 1. As a result, all three samples had a bonding strength of about 20 MPa, with generally no differences. This indicates that alumina powders having average particle sizes between about 0.1 μm and 10 μm exhibit no differences in their adhesion strengths, and that these average particle sizes are moderate particle sizes.

Second Characteristic Evaluation

Next, results of producing a battery having an inorganic insulating layer 13 (Example) and a battery not having an inorganic insulating layer 13 (Comparative Example), and evaluating the characteristics of each battery, will be described.

Example 1

As Example 1, batteries A to C were formed. Battery A is a battery in which the electron insulating layer 13 is placed between the positive-electrode active material layer 12 and the separator 14 as shown in FIG. 1(*a*), whereas batteries B and C are batteries lacking a separator 14 as shown in FIG. 7.
(1) Synthesis of Lithium Complex Oxide Three kg of a mixture of nickel sulfate, cobalt sulfate, and aluminum sulfate, which were mixed so that the molar ratio between Ni atoms, Co atoms, and Al atoms was 80:15:5, was dissolved in 10 L of water, thus obtaining a source solution. To this source solution, 400 g of sodium hydroxide was added to obtain a precipitate. After sufficiently washing this precipitate with water, it was dried, thus obtaining coprecipitating hydroxide. To 3 kg of the resultant coprecipitating hydroxide, a predetermined amount of lithium hydroxide was mixed, and this was baked at temperature 750° C. for 10 hours in an ambient having an oxygen partial pressure of 0.5 atmospheric pressure, thus obtaining lithium complex oxide ($LiNi_{0.8}Co_{0.15}Al_{0.05}O_2$).
(2) Production of Positive Electrode Using the aforementioned lithium nickelate powder as the material of the positive-electrode active material layer 12 (active material powder), 1 kg of active material powder, 0.5 kg of PVDF#1320 manufactured by KUREHA CORPORATION (an N-methyl-2-pyrrolidone (NMP) solution having a solid content of 12 weight %), and 40 g of acetylene black were agitated with an appropriate amount of NMP by a double-arm kneader, thus preparing a paste of positive electrode mixture. This paste of positive electrode mixture was applied onto a current collector 11*a* composed of an Al foil having a thickness of 15 μm and dried, and was thereafter subjected to a roll treatment for a total thickness of 65 μm, thus forming the positive-electrode active material layer 12.

Furthermore, by using a film formation apparatus as shown in FIG. 6, an inorganic insulating layer 13 of alumina was deposited on the positive-electrode active material layer 12. In this Example, positive electrode plates A, B, and C were formed, and the film thickness of their respective inorganic insulating layers 13 were 1 μm, 10 μm, and 20 μm. The film formation conditions were as follows: the alumina source material had an average particle size of 0.8 μm; the degree of vacuum at film formation was 100 Pa; the carrier gas flow rate was 10 L/min; the film formation temperature was 30° C.; and the carrier gas was helium. Thus, while moving the positive electrode 1 and the nozzle 55 so that film formation would occur in a 20 mm×20 mm region, the inorganic insulating layer 13 was formed. While keeping a constant film formation rate for forming respective positive electrode plates A, B, and C, the film formation time was varied between 10 min, 50 min, and 100 min, thus obtaining different film thicknesses.

Figure 11:
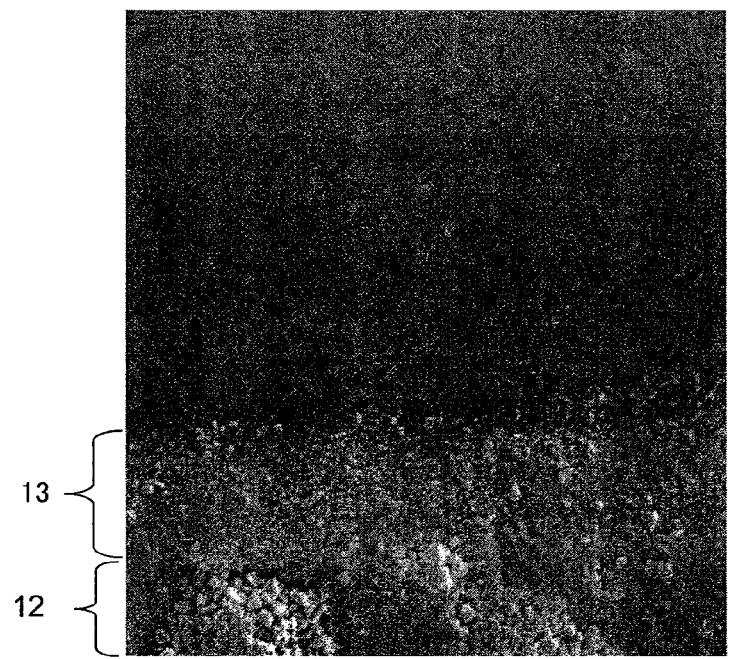
FIG. 11 is a diagram representing an SEM image of a cross section (a cross section along a direction which is perpendicular to a plane upon which a positive-electrode current collector 11 and a positive-electrode active material layer 12 are bonded together) of positive electrode B in Example 1.

FIG. 11 is a diagram representing an SEM image of a cross section of (a cross section along a direction which is perpendicular to a plane upon which the positive-electrode current collector 11 and the positive-electrode active material layer 12 are bonded together) positive electrode B. As shown in FIG. 11, it was confirmed that the inorganic insulating layer 13 of alumina was densely deposited on the positive-electrode active material layer 12 while maintaining a flat particle form.

(3) Production of Negative Electrode

Three kg of artificial graphite was agitated together with 200 g of BM-400B manufactured by ZEON CORPORATION (a dispersion of a modified styrene-butadiene rubber having a solid content of 40 weight %), 50 g of carboxymethyl cellulose (CMC), and an appropriate amount of water by a double-arm kneader, thus preparing a negative electrode mixture. After this negative electrode mixture was applied onto one face of a negative-electrode current collector 16 composed of a copper foil having a thickness of 12 µm, it was dried and subjected to rolling, thus forming the active material layer 12b on the negative-electrode current collector 16. Thus, a negative electrode 2 having a thickness of 160 nm was obtained.

(4) Assembly of Battery

The positive electrode 1 and the negative electrode 2 obtained as above were combined to form an electrode group. The positive electrode lead 36 was connected to the positive-electrode current collector 11, and the negative electrode lead 37 was connected to the negative-electrode current collector 16. The separator 14 was sandwiched by only positive electrode plate A and the negative electrode 2, whereas no separator 14 was sandwiched by positive electrode plate B or C and the negative electrode 2. The electron insulating layer 13 on positive electrode plate B and the negative-electrode active material layer 15 of the negative electrode 2 were allowed to be in contact. A power-generating element was sandwiched by two films, and thereafter the peripheries of the two films were bonded by thermal pressure bonding, thus constructing an outer case 35 composed of the films, and the electrode group was accommodated into the outer case 35. At this point, 5 g of nonaqueous electrolyte solution was injected into the outer case 35. As the nonaqueous electrolyte solution, what was obtained by dissolving $LiPF_6$ at a concentration of 1.5 mol/L in a mixed solvent of ethylene carbonate and methyl ethyl carbonate (volume ratio 10:30), which contained 2 weight % vinylene carbonate, 2 weight % vinylethylene carbonate, 5 weight % fluorobenzene, and 5 weight % phosphazene, was used. Moreover, both ends of the outer case 35 were filled with the resin material 38, thus sealing the outer case 35 and fixing the positive electrode lead 36 and the negative electrode lead 37. Thus, lithium-ion secondary batteries A, B, and C having electrodes A, B, and C were produced.

Example 2

In Example 2, as the materials of the inorganic insulating layer 13, silica, titania, magnesia, and mullite were used instead of alumina. Otherwise under similar conditions to those in Example 1, positive electrode plates D, E, F, and G were produced. By using positive electrodes D, E, F, and G, batteries D, E, F, and G lacking a separator were produced by a method similar to that of Example 1.

Example 3

As Example 3, battery I was formed as shown in FIG. 8, such that electron insulating layers 13 were formed on the surface of the positive-electrode active material layer 12 and on the surface of the separator 14. The method thereof is described below.

On a positive-electrode active material layer similar to the positive-electrode active material layer of Example 1, an inorganic insulating layer 13 composed of alumina having a thickness of 2 µm was formed (positive electrode plate I). The film formation conditions were as follows: the alumina source material had an average particle size of 0.8 µm; the degree of vacuum at film formation was 100 Pa; the carrier gas flow rate was 10 L/min; the film formation temperature was 30° C.; and the carrier gas was helium. Thus, while moving the positive electrode 1 and the nozzle 55 so that film formation would occur in a 20 mm×20 mm region, the inorganic insulating layer 13 was formed. A constant film formation rate was kept for forming the inorganic insulating layer 13 of positive electrode plate I, and the film formation time was 20 min.

On a separator 14 composed of polyethylene, an inorganic insulating layer 13 composed of alumina having a thickness of 2 µm was deposited (separator I). The film formation conditions were as follows: the alumina source material had an average particle size of 0.8 µm; the degree of vacuum at film formation was 700 Pa; the carrier gas flow rate was 15 L/min; the film formation temperature was 30° C.; and the carrier gas was helium. While moving the separator 14 and the nozzle 55 so that film formation would occur in a 20 mm×20 mm region, the inorganic insulating layer 13 was formed. A constant film formation rate was kept for forming the inorganic insulating layer 13 of separator I, and the film formation time was 20 min.

A negative electrode was formed by a method similar to that of Example 1. This negative electrode, positive electrode plate I, and separator I were assembled by a method similar to that of Example 1, thus obtaining battery I.

Comparative Example 1

A positive electrode including a positive current collector and a positive-electrode active material layer and a negative electrode including a negative-electrode current collector and a negative-electrode active material layer were placed with a separator sandwiched therebetween, thus obtaining an electrode group. No inorganic insulating layer was formed on the surface of the positive-electrode active material layer or the surface of the negative-electrode active material layer. As a separator, a composite film of polyethylene and polypropylene (2300 manufactured by Celgard K.K., having a thickness of 25 µm) was used, thus producing comparative battery H.

Comparative Example 2

On a positive-electrode active material layer similar to the positive-electrode active material layer of Example 1, a positive electrode having an inorganic insulating layer containing a binder was formed (positive electrode J). A porous paste for the inorganic insulating layer was produced by, using an alumina powder having an average particle size of 1 µm, agitating 950 g of alumina powder, 625 g of a modified polyacrylonitrile rubber binder agent BM-720H manufactured by ZEON CORPORATION (solid content: 8 weight %), and an appropriate amount of NMP with a double-arm kneader. This was applied upon the positive-electrode active material layer, and then dried, thus obtaining the inorganic insulating layer. Positive electrode J and a negative electrode lacking an inorganic insulating layer were placed with a separator sandwiched therebetween, thus obtaining electrode group J. This electrode group J was assembled by a method similar to that of Example 1, thus obtaining battery J.

Characteristic Evaluation

Batteries A to G and I obtained according to the above-described Examples and comparative batteries H and J obtained according to Comparative Examples were subjected to a charge process with a charge voltage of 4.3 V. Thereafter, a charge-discharge rate test was conducted in an environment of 20° C. The charging and discharging conditions were as follows: a constant-current charging at 2.5 mA/cm² was performed until the closed circuit voltage of each battery reached 4.3 V; and, after the closed circuit voltage reached 4.3 V, a constant voltage charging was performed at 4.3 V until the charge current decreased to 100 mA. The voltage values before and after leaving each in a charged state for 72 hours were measured, and a rate of voltage change was checked. Furthermore, the temperature of each battery having been charged was elevated to 150° C. (or 160° C. for batteries I and J) at a rate of temperature elevation of 5° C./min, and was maintained at that temperature, thus conducting a heating test. Among these results, those of batteries A to H are shown in Table 1, and those of batteries I and J are shown in Table 2.

than does comparative battery H, and also have a good stability. Furthermore, in a heating test of being maintained at 150° C., the temperatures of batteries A to G of Examples 1 and 2 never exceeded 150° C. Moreover, the temperature of battery I of Example 3 never exceeded 160° C. On the other hand, it was observed for comparative battery H that, after 60 minutes since the start of the test, its temperature exceeded 150° C. It was observed for comparative battery J that, after 60 minutes since the start of the test, its temperature exceeded 160° C. These results indicate that the batteries A to G and I of Examples 1 to 3 have a high thermal stability, and among others, battery I of Example 3 has an especially high stability.

A nonaqueous electrolyte secondary battery according to the present invention has an excellent thermal stability, and therefore is useful as a power supply for electronic devices such as mobile devices, information devices, communications devices, and AV devices, e.g., as a portable power supply having an excellent safety.

While the present invention has been described with respect to preferred embodiments thereof, it will be apparent to those skilled in the art that the disclosed invention may be modified in numerous ways and may assume many embodi-

TABLE 1

| | material of insulating layer | presence or absence of separator | particle size into which source material was crushed μm | film thickness of insulating layer μm | packing fraction of insulating layer % | open circuit voltage after 72 hours V | heating safety (150° C. heating test) |
|---|---|---|---|---|---|---|---|
| battery A | alumina | YES | 0.8 | 2.4 | 92 | 3.98 | maintained at 150° C. |
| battery B | alumina | NO | 0.8 | 9.5 | 86 | 4.05 | maintained at 150° C. |
| battery C | alumina | NO | 0.8 | 19.6 | 80 | 4.08 | maintained at 150° C. |
| battery D | silica | NO | 1.1 | 8.9 | 89 | 4.01 | maintained at 150° C. |
| battery E | titania | NO | 1.2 | 9.1 | 92 | 4.04 | maintained at 150° C. |
| battery F | magnesia | NO | 1.6 | 9.3 | 88 | 4.01 | maintained at 150° C. |
| battery G | mullite | NO | 1.0 | 9.6 | 85 | 4.03 | maintained at 150° C. |
| battery H | NO | YES | — | — | — | 3.95 | after 60 minutes, maintained at 150° C. |

TABLE 2

| | material of insulating layer | presence or absence of separator | presence or absence of binder in insulating layer | film thickness of insulating layer μm | packing fraction of insulating layer % | heating safety (160° C. heating test) |
|---|---|---|---|---|---|---|
| battery I | alumina | YES | NO | 4.0 | 85 | maintained at 160° C. |
| battery J | alumina | YES | YES | 4.0 | 40 | after 60 minutes, over 160° C. |

As shown in Table 1 and Table 2, the open circuit voltage value after 72 hours was higher than 3.95 V of comparative battery H for both battery A having a separator and batteries B to G lacking a separator. Among batteries A to G of Examples 1 and 2, all batteries had a high open circuit voltage value, although varying in terms of the particle size of source material, film thickness, and packing fraction. Thus, it has been found that, batteries A to G of Examples 1 and 2 have less self-discharge and a higher electrolyte insulation ability ments other than those specifically described above. Accordingly, it is intended by the appended claims to cover all modifications of the invention that fall within the true spirit and scope of the invention.

What is claimed is:

1. A production method for a nonaqueous electrolyte secondary battery, the nonaqueous electrolyte secondary battery including a positive electrode having a positive-electrode active material layer, a negative electrode having a negative-electrode active material layer, and a separator, the method comprising steps of:
- (a) jetting an aerosol onto a surface of the separator, the aerosol including inorganic particles dispersed in a gas, thereby forming on the separator a porous inorganic insulating layer that contains no binder and is composed of the inorganic particles; and
- (b) forming an electrode group by allowing the separator to be sandwiched by the positive electrode and the negative electrode, accommodating the electrode group in a case, and thereafter filling the case with a nonaqueous electrolyte.

2. The production method of claim 1, wherein the aerosol contains inorganic particles of one or more materials selected from the group consisting of alumina, mullite, silica, titania and magnesia.

3. The production method of claim 1, wherein the aerosol contains alumina.

4. The production method of claim 1, wherein the separator is made of resin.

5. The production method of claim 1, wherein the separator is made of a polyolefin-type resin.

* * * * *